United States Patent [19]
Callahan et al.

[11] Patent Number: 6,139,327
[45] Date of Patent: Oct. 31, 2000

[54] REMOTELY CONTROLLED SIMULATED LINEAR CIRCUIT BREAKER ASSEMBLY

[75] Inventors: Mark Arthur Callahan, Stewartstown, Pa.; Jeffrey Joseph Perloski, Freeland, Md.; Christopher Joseph Murk, Monkton, Md.; John Nicholas Merkle, Reisterstown, Md.

[73] Assignee: AAI Corporation, Cockeysville, Md.

[21] Appl. No.: 09/002,082

[22] Filed: Dec. 31, 1997

[51] Int. Cl.⁷ .................................................. G09B 69/00
[52] U.S. Cl. .......................................................... 434/224
[58] Field of Search ...................... 434/219, 224

[56] References Cited

U.S. PATENT DOCUMENTS

| | | | |
|---|---|---|---|
| 3,648,002 | 3/1972 | Du Rocher | 200/166 |
| 3,889,106 | 6/1975 | Alliston et al. | 434/219 |
| 4,623,312 | 11/1986 | Crawford | 434/224 |
| 4,776,798 | 10/1988 | Crawford | 434/224 |
| 4,813,443 | 3/1989 | Pounder | 137/1 |

*Primary Examiner*—Jessica J. Harrison
*Attorney, Agent, or Firm*—Venable; James R. Burdett; Catherine A. Ferguson

[57] ABSTRACT

A remotely controlled simulated linear circuit breaker capable of being set and reset remotely, and manually operated. Control signals are received by an on-board controller circuit card assembly. The signals will cause a plunger located in a solenoid housing to do one of two things. Either it will be extracted out of the solenoid housing, thereby popping the simulated circuit breaker, or it will be pulled into the solenoid housing, thereby resetting the simulated circuit breaker. In addition, the position of the switch is remotely sensed.

34 Claims, 4 Drawing Sheets

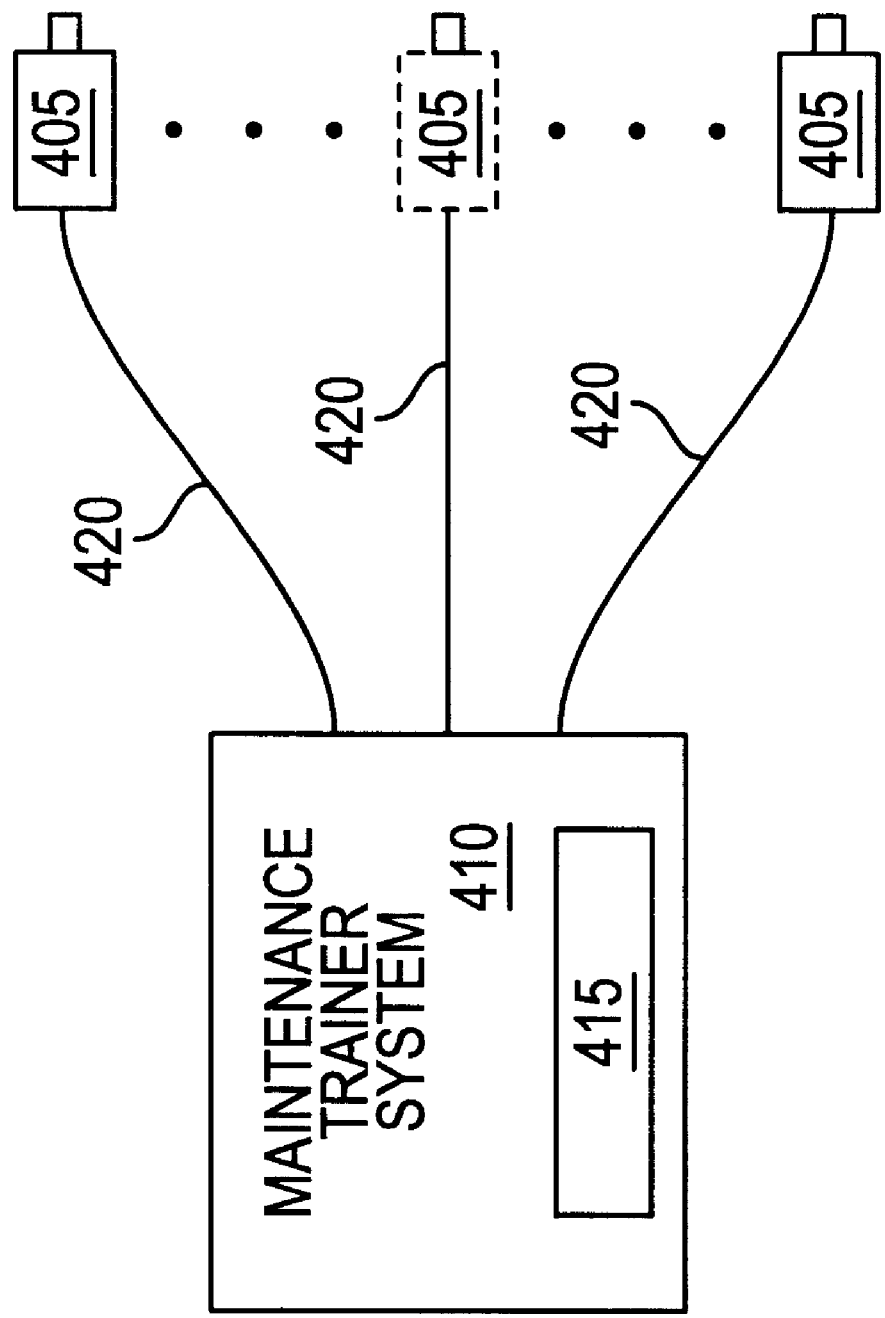

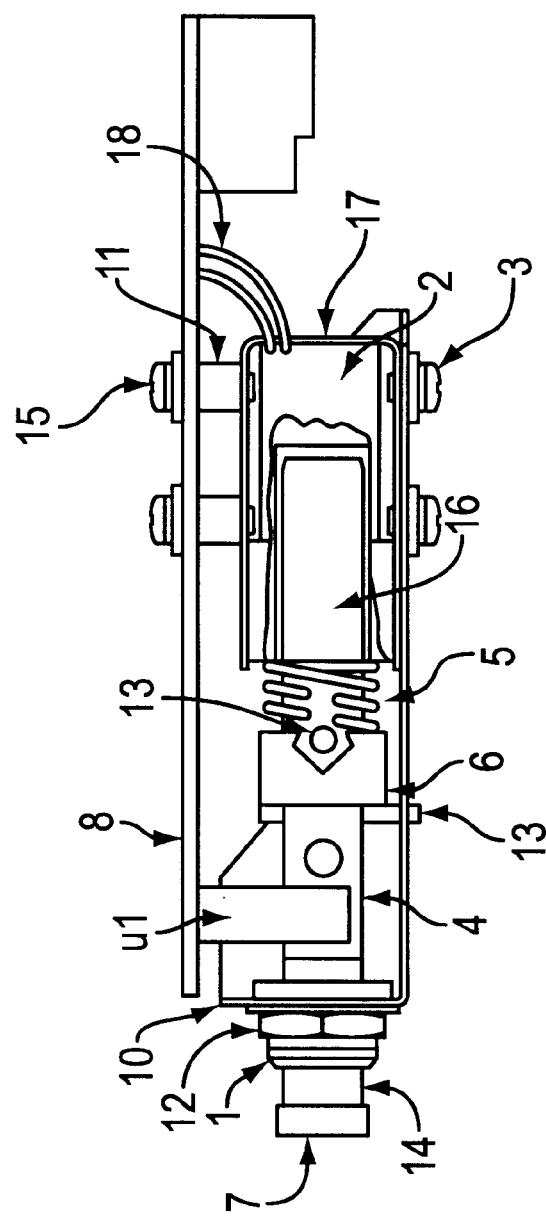

REMOTELY CONTROLLED SIMULATED LINEAR CIRCUIT BREAKER ASSEMBLY

BACKGROUND OF THE INVENTION

When a student uses System Test Equipment (STE), the trainer must typically reset all circuit breakers to a normal initial operating position on the remotely controlled simulated equipment prior to allowing the trainee to begin his testing. Existing equipment allows detection of the breaker position. However, they cannot automatically be set to a desired initial position. The prior art does not contain an apparatus for automatically presetting the breaker positions.

SUMMARY OF THE INVENTION

One object of the invention is to provide a push button type circuit breaker that can be remotely set and reset in lieu of manual set and reset.

In addition, a second object of the invention is to provide a push button type circuit breaker whose position can be remotely sensed.

Still a third object of the invention is to provide an automatic push button type circuit breaker which provides the same feel and appearance as an ordinary circuit breaker and can be manually operated.

BRIEF DESCRIPTION OF THE DRAWINGS

FIG. 3 illustrates a plurality of remotely controlled simulated linear circuit breakers in a maintenance system trainer.

FIGS. 4A and 4B are respectively side and front views of assembly drawings of the remotely controlled simulated linear circuit breaker assembly.

DETAILED DESCRIPTION OF THE INVENTION

Figure 1:
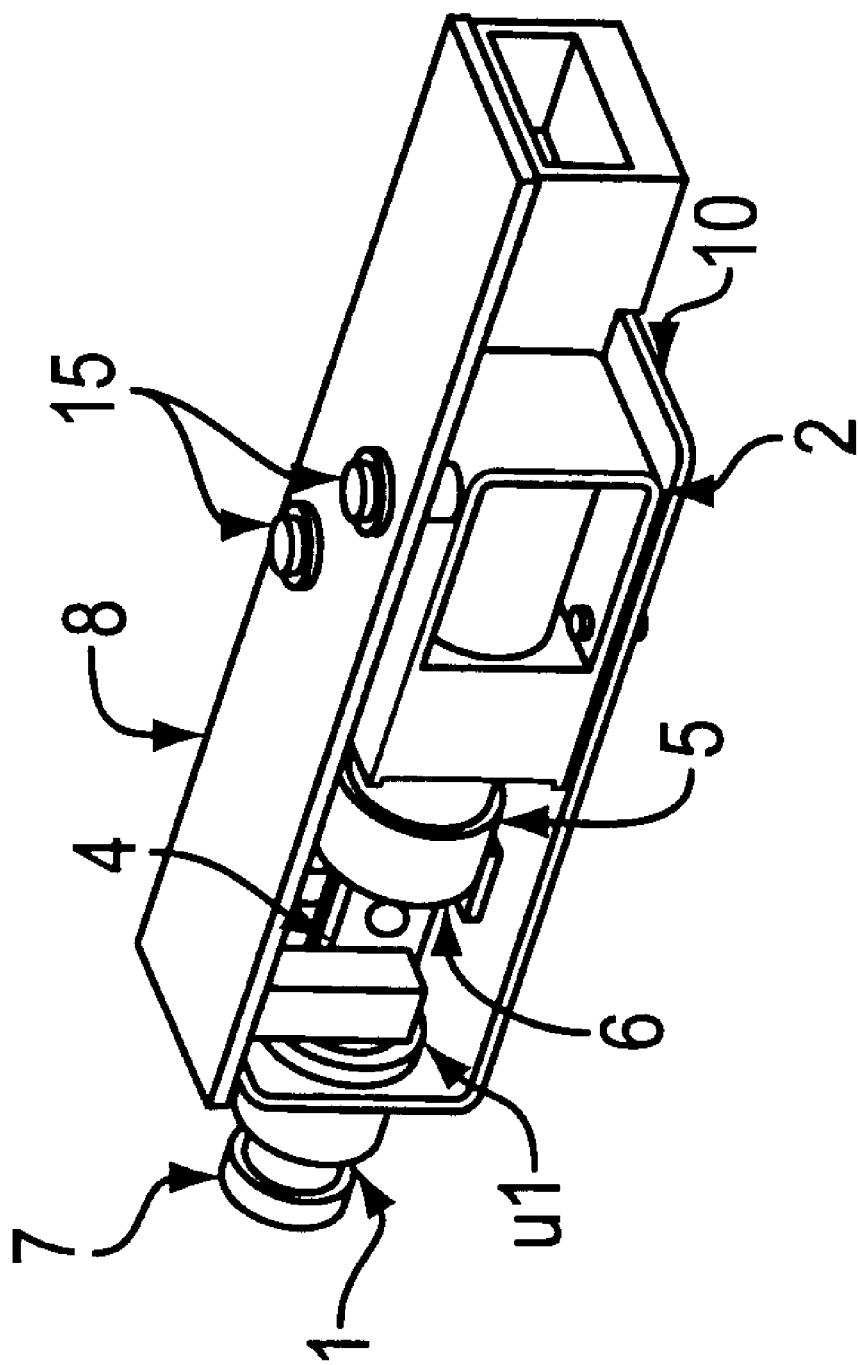
FIG. 1 is a perspective view assembly drawing of the remotely controlled simulated linear circuit breaker assembly.
Figure 2:
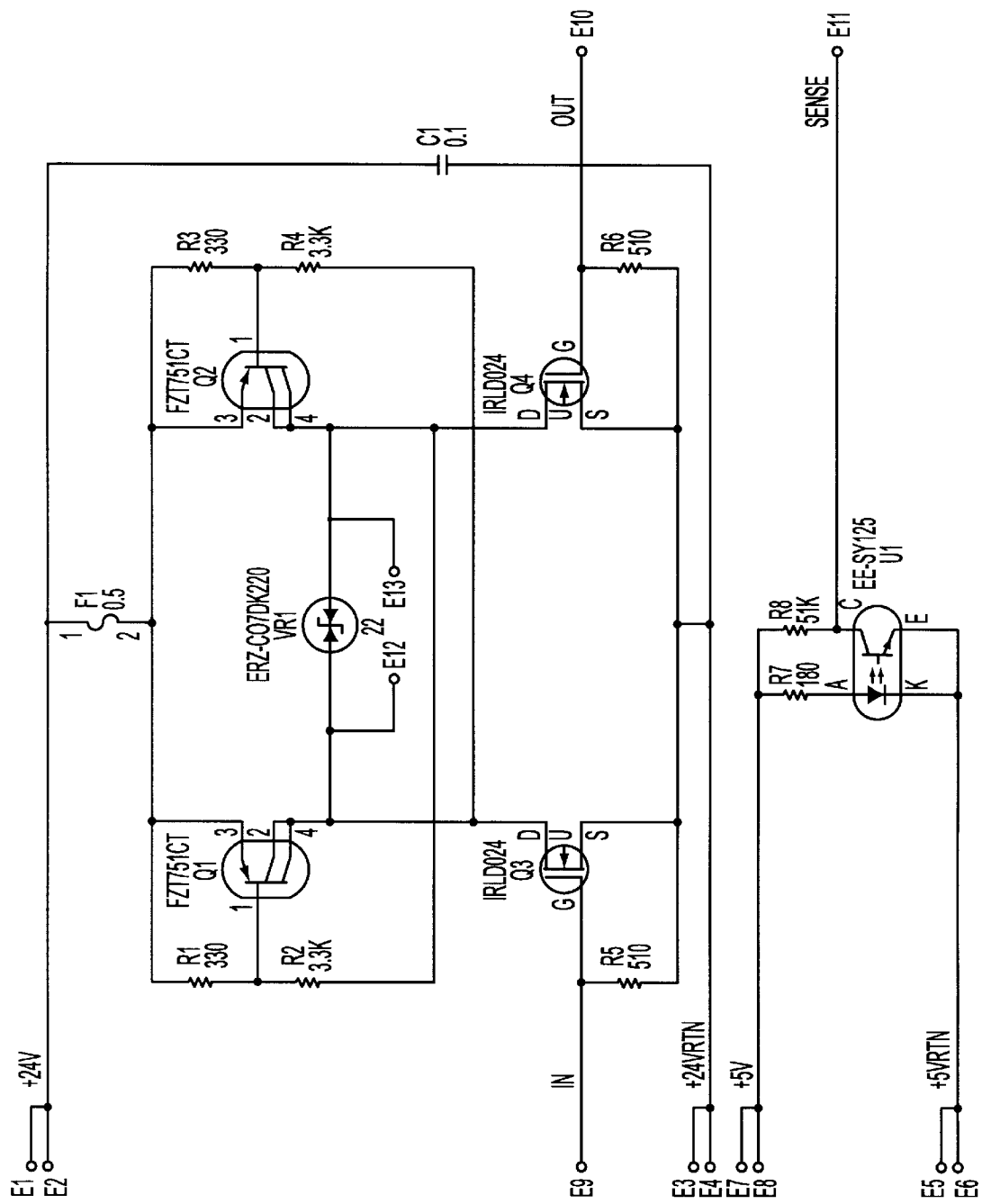
FIG. 2 is a schematic of the circuit breaker electronic drive circuit card assembly.

The components of the remotely controlled linear circuit breaker assembly are described with reference to FIGS. 1, 2, 4A and 4B. A mounting bracket 10 serves as the mounting frame supporting the components. This bracket provides the mounting interface to the front panel via the bushing 1 and nut 12. A magnetic latching solenoid 2 which consists of a housing 17, a plunger 16 seated within the housing and two leads 18, is attached to the mounting frame by means of associated hardware 3. This solenoid 2 is located in such a manner as to provide the support and proper alignment of the shaft 4 through the compression spring 5 and spacer washer 6 fixed in place via two spring pins 13, one of which limits the linear travel of the shaft by riding in a slot located in the circuit breaker mounting bracket.

Attached to the end of the shaft is the cap 7, which allows for the manual operation of the circuit breaker while displaying the appearances of a real-time device. The cap includes a recessed cup 9 on the front allowing for the application of an amperage label. Located on the shaft directly behind the cap is an indicator ring, which provides for easy identification of a "tripped" circuit as exists on the real device.

Mounted to a side of the solenoid 2 by means of spacers 11 and associated hardware 15 is an electronic drive circuit card assembly, called a controller circuit card assembly 8. This electronic drive circuit controls the operation of the device, while providing for automatic computer control during training student exercises.

The device is designed in such a manner that the magnetic latching solenoid magnetic field and the compression force of the compression spring 5 are used in opposition to one another to provide a realistic tactile simulation of a circuit breaker assembly. The spring 5 and solenoid 2 were chosen because when the spring 5 is at its maximum expansion, the magnetic field of the solenoid 2 is too weak to compress the spring 5 through the solenoid plunger 16. When the plunger is fully engaged in the solenoid housing, the compression force is too small to extract the plunger from the housing. This allows the shaft/cap assembly to be manually pushed in or pulled out, thus remaining stable.

When applying an electric current through the solenoid winding through the leads 18, which are connected and electrically coupled to the electronic drive circuit card assembly 8, the magnetic field of the latching solenoid is increased or negated depending upon the direction of the current flow. When the solenoid plunger is initially fully seated in the solenoid housing, the solenoid is extracted by applying a current through the winding that negates the magnetic field. In that instance, the compression force of the spring is able to withdraw the plunger from the solenoid housing thereby "popping" the simulated circuit breaker.

In the opposite case, when the solenoid plunger is initially extracted from the solenoid housing, it is magnetically pulled back into the housing if a sufficient current is applied to the solenoid winding that increases the magnetic field, thereby overcoming the compression force of the compression spring 5 and "resetting" the simulated circuit breaker.

Operation of the electronic drive circuit card assembly 8 is as follows. The electronic drive circuit provides directional current flow to the solenoid winding. When a TTL level voltage is applied to the gate of the lower left FET transistor (Q3) (see FIG. 2), its drain-to-source impedance goes to a minimum value (typically less than one ohm). This condition effectively connects the 24 Volt return at plated through holes E3 and E4 to one lead of the solenoid 2 winding, which is soldered to a plated through hole on the electronic drive circuit card assembly 8 designated E12. The low impedance of FET transistor Q3 also biases the upper right PNP transistor (Q2) through resistors R3 and R4, turning it on, thus allowing current to flow through the emitter-to-collector junctions and into the opposite lead of the solenoid 2 winding, which is soldered at plated through hole E13. R3 and R4 are selected to bias Q2 into saturation whenever Q3 is turned on.

Reverse current flow through the solenoid 2 winding is obtained by applying a TTL level voltage to the gate of the lower right FET transistor (Q4), turning it on. Turning on Q4 also biases and turns on Q1 through resistors R1 and R2, thereby allowing a reverse current flow through the solenoid 2 winding, when the lower right FET transistor (Q4) is turned on. When a TTL level voltage is applied to the gate of the lower right FET transistor (Q4), its drain-to-source impedance goes to a minimum value (typically less than 1 ohm). This condition effectively grounds the lead of the solenoid 2 winding that is soldered at E13 (which was ungrounded with forward current flow). The low impedance also biases the upper left PNP transistor (Q1) through resistors R1 and R2, turning it on, thus allowing current to flow through the emitter-to-collector junctions and into the opposite lead of the solenoid winding 2, which is soldered at E12 (which was grounded with forward current flow), thereby allowing a reverse current flow through the solenoid 2 winding. R1 and R2 are selected to bias Q1 into saturation whenever Q4 is turned on. On Q1 and Q2, pin 1 is the base, pins 2 and 4 are the collectors, and pin 3 is the emitter.

The polysilicon fuse (F1) protects the circuit in the event both FET transistors are turned on at the same time. The value of F1 is rated at 0.5 amps and is selected to allow for one solenoid to pass but in the event that both FET transistors are turned on at the same time the fuse would open. The transient suppressor (VR1) is placed across the solenoid 2 winding to reduce back EMF transients whenever the solenoid 2 winding current is turned off. C1 is a 0.1 microfarad bypass capacitor. It presents a low impedance to high frequency noise on the power line and shunts the noise to ground.

An optical sensor (U1) is also located on the electronic drive circuit card assembly that senses when a beam of light is interrupted. This sensor is U-shaped and is capable of transmitting a beam of light from one side of the "U" and then detecting if the light beam has been received by the opposite side of the "U". A hole in the shaft of the simulated remotely controlled circuit breaker allows light to pass through when the shaft is in the "out" position and conversely blocks the light transmission when the shaft is in the "in" position. Monitoring the sensor's U1 output provides for remote detection of the simulated remotely controlled circuit breaker. Resistors R7 and R8 bias the input and output circuits, respectively, of the optical sensor. Resistors R5 and R6 bias the inputs of FET transistors Q3 and Q4 off in the absence of an input signal and provide for noise immunity.

Eleven other plated through holes are contained on the electronic drive circuit card assembly 8. E1 and E2 provide connections for inputting +24 volt DC power. E3 and E4 provide the return path connection for +24 volt power. Similarly, E7 and E8 provide connections for +5 volt DC power and E5 and E6 provide the return path for +5 volt power. Plated through holes E9 and E10 provide solder connections for the TTL input signals that control FET transistors Q3 and Q4, respectively. E9 and E10 are the locations of a first and a second input for the electronic drive circuit card assembly. On FIG. 2, the labels "IN" and "OUT" refer to the plunger position. Plated through hole E11 provides a connection point to the output of photo sensor U1.

FIG. 3 shows a plurality of remotely controlled simulated linear circuit breakers that comprise a maintenance system trainer. The trainer would control the operation of all of the remotely controlled simulated linear circuit breakers from his/her station. The maintenance system trainer comprises a plurality of remotely controlled simulated linear circuit breakers 405. Each remotely controlled simulated linear circuit breaker 405 is connected and electrically coupled to a control means via signal carrying means 420. The control means is a computer 410 having software 415 resident therein. The software generates control voltage pulses, which control the operation of the remotely controlled toggle switches. This is accomplished when the control voltage pulses, along with 24 volt power and 24 volt and 5 volt power returns are transmitted to the electronic drive circuit card assembly of the remotely controlled simulated linear circuit breaker as signals to inputs E1–E10 of the electronic drive circuit card assembly.

While the invention has been disclosed in this patent application by reference to the details of preferred embodiments of the invention, it is to be understood that the disclosure is intended in an illustrative, rather than in a limiting sense, as it is contemplated that modifications will readily occur to those skilled in the art, within the spirit of the invention and the scope of the appended claims.

We claim as our invention:

1. A remotely controlled simulated linear circuit breaker assembly comprising:

a solenoid having a first and a second lead;

a housing;

a plunger seated inside said housing;

a compression spring reciprocally connected to said plunger;

a cap attached to one end of said plunger, said cap allowing for manual operation of said remotely controlled simulated linear circuit breaker assembly;

a controller circuit card assembly having a first input and a second input, a first output connected and electrically coupled to said first lead of said solenoid, and a second output connected and electrically coupled to said second lead of said solenoid, whereby when a control voltage is applied to said first input of said controller circuit card assembly, said plunger is extracted from said solenoid housing by said spring, and when a control voltage is applied to said second input of said controller circuit card assembly, said plunger is pulled into said solenoid housing.

2. The remotely controlled simulated linear circuit breaker assembly according to claim 1, wherein said cap further comprises a recessed cup on the front of said cap.

3. The remotely controlled simulated linear circuit breaker assembly according to claim 2, wherein said first and second amplifiers are PNP transistors and said third and fourth amplifiers are FET transistors.

4. The remotely controlled simulated linear circuit breaker assembly according to claim 1, further comprising an indicator ring marked on said plunger and positioned behind said cap.

5. The remotely controlled simulated linear circuit breaker assembly according to claim 1, wherein said controller card circuit assembly further comprises:

a first amplifier connected and electrically coupled between supply voltage and said first lead of said solenoid and a second amplifier connected and electrically coupled between supply voltage and said second lead of said solenoid;

a third amplifier connected and electrically coupled between said first input of said controller card circuit assembly and said first lead of said solenoid and a fourth amplifier connected and electrically coupled between said second input of said controller card circuit assembly and said second lead of said solenoid;

whereby when a control voltage is applied to said first input of said controller card circuit assembly, current flows from said second amplifier through said second lead of said solenoid to said first lead of said solenoid, and when a control voltage is applied to said second input of said controller card circuit assembly, current flows from said first amplifier through said first lead of said solenoid to said second lead of said solenoid.

6. The remotely controlled simulated linear circuit breaker assembly according to claim 1, wherein said controller card circuit assembly further comprises:

a hole in said plunger to allow a light beam to pass through when said plunger is extracted from said solenoid housing; and an optical sensor for sensing said light beam.

7. The remotely controlled simulated linear circuit breaker assembly according to claim 6, wherein said optical sensor is a photo interrupter.

8. The remotely controlled simulated linear circuit breaker assembly according to claim 1, further comprising a transient suppressor connected and electrically coupled in parallel with said solenoid leads to reduce back EMF transients.

9. A method of controlling a remotely controlled simulated linear circuit breaker assembly comprising the steps of:

applying a current through a solenoid winding in either a forward or a reverse direction;

extracting a plunger from or pushing a plunger into a solenoid housing respectively;

setting or resetting the remotely controlled simulated linear circuit breaker assembly respectively; and sensing a beam of light to determine the position of said simulated linear circuit breaker assembly.

10. A maintenance trainer system comprising a plurality of remotely controlled simulated linear circuit breaker assemblies, wherein each of said remotely controlled simulated linear circuit breaker assemblies comprises:

a solenoid having a first and a second lead;

a housing;

a plunger seated inside said housing;

a compression spring reciprocally connected to said plunger;

a cap attached to one end of said plunger, said cap allowing for manual operation of said remotely controlled simulated linear circuit breaker assembly;

a controller circuit card assembly having a first input and a second input, a first output connected and electrically coupled to said first lead of said solenoid, and a second output connected and electrically coupled to said second lead of said solenoid, whereby when a control voltage is applied to said first input of said controller circuit card assembly, said plunger is extracted from said solenoid housing by said spring, and when a control voltage is applied to said second input of said controller circuit card assembly, said plunger is pulled into said solenoid housing.

11. The maintenance trainer system according to claim 10, wherein said cap further comprises a recessed cup on front of said cap.

12. The maintenance trainer system according to claim 10, wherein each of said remotely controlled simulated linear circuit breaker assemblies further comprises an indicator mark on said plunger and positioned behind said cap.

13. The maintenance trainer according to claim 10, wherein each of said controller card circuit assemblies further comprises:

a first amplifier connected and electrically coupled between supply voltage and said first lead of said solenoid and a second amplifier connected and electrically coupled between supply voltage and said second lead of said solenoid;

a third amplifier connected and electrically coupled between said first input of said controller card circuit assembly and said first lead of said solenoid and a fourth amplifier connected and electrically coupled between said second input of said controller card circuit assembly and said second lead of said solenoid, whereby when a control voltage is applied to said first input of said controller card, current flows from said second amplifier through said second lead of said solenoid to said first lead of said solenoid, and when a control voltage is applied to said second input of said controller card, current flows from said first amplifier through said first lead of said solenoid to said second lead of said solenoid.

14. The maintenance trainer according to claim 13, wherein said first and second amplifiers are PNP transistors and said third and fourth amplifiers are FET transistors.

15. The maintenance trainer according to claim 10, wherein each of said controller card circuit assemblies further comprises:

a hole in said plunger to allow a beam of light to pass through when said plunger is in extracted from said solenoid housing; and an optical sensor for sensing said light.

16. The maintenance trainer according to claim 15, wherein said optical sensor is a photo interrupter.

17. The maintenance trainer according to claim 10, wherein each of said remotely controlled simulated linear circuit breaker assemblies further comprises a transient suppressor connected and electrically coupled in parallel with said solenoid leads to reduce back EMF transients.

18. A method of controlling a remotely controlled simulated linear circuit breaker assembly located in a maintenance trainer system comprising the steps of:

applying a current through a solenoid winding in either a forward or a reverse direction;

extracting a plunger from or pushing a plunger into a solenoid housing respectively;

setting or resetting the remotely controlled simulated linear circuit breaker assembly respectively; and sensing a beam of light to determine the position of said simulated linear circuit breaker assembly.

19. A remotely controlled simulated linear circuit breaker assembly comprising:

a solenoid having a first and a second lead;

a housing;

a plunger seated inside said housing;

a compression spring reciprocally connected to said plunger;

a cap attached to one end of said plunger, said cap allowing for manual operation of said remotely controlled simulated linear circuit breaker assembly;

a controller circuit card assembly having a first input and a second input, a first output connected and electrically coupled to said first lead of said solenoid, and a second output connected and electrically coupled to said second lead of said solenoid, whereby when a control voltage is applied to said first input of said controller circuit card assembly, said plunger is extracted from said solenoid housing by said spring, and when a control voltage is applied to said second input of said controller circuit card assembly, said plunger is pulled into said solenoid housing, or in the alternative, in the absence of a control voltage being applied, said remotely controlled simulated linear circuit breaker assembly may be operated manually.

20. The remotely controlled simulated linear circuit breaker assembly according to claim 19, wherein the cap further comprises a recessed cup on the front of said cap.

21. The remotely controlled simulated linear circuit breaker assembly according to claim 20, wherein said first and second amplifiers are PNP transistors and said third and fourth amplifiers are FET transistors.

22. The remotely controlled simulated linear circuit breaker assembly according to claim 19, further comprising an indicator ring on said plunger and positioned behind said cap.

23. The remotely controlled simulated linear circuit breaker assembly according to claim 19, wherein said controller circuit card assembly further comprises:

a first transistor connected and electrically coupled between a supply voltage and said first lead of said solenoid and a second transistor connected and electrically coupled between said supply voltage and said second lead of said solenoid; and a third transistor connected and electrically coupled between said first input of said controller circuit card assembly and said first lead of said solenoid and a fourth transistor connected and electrically coupled between said second input of said controller circuit card assembly and said second lead of said solenoid, whereby when a control voltage is applied to said first input of said controller card circuit assembly, current flows from said second transistor through said second lead of said solenoid to said first lead of said solenoid, and when a control voltage is applied to said second input of said controller circuit card assembly, current flows from said first transistor through said first lead of said solenoid to said second lead of said solenoid, or in the alternative, in the absence of a control voltage being applied, said remotely controlled simulated linear circuit breaker assembly may be operated manually.

24. The remotely controlled simulated linear circuit breaker assembly according to claim 19, wherein said controller circuit card assembly further comprises:

a hole in said plunger to allow a light beam to pass through when said plunger is extracted from said solenoid housing; and an optical sensor for sensing said light beam.

25. The remotely controlled simulated linear circuit breaker assembly according to claim 24, wherein said optical sensor is a photo interrupter.

26. The remotely controlled simulated linear circuit breaker assembly according to claim 19, further comprising a transient suppressor connected and electrically coupled in parallel with said solenoid leads to reduce back EMF transients.

27. A maintenance trainer system comprising a plurality of remotely controlled simulated linear circuit breaker assemblies, wherein each of said remotely controlled simulated linear circuit breaker assemblies comprises:

a solenoid having a first and a second lead;

a housing;

a plunger seated inside said housing;

a compression spring reciprocally connected to said plunger;

a cap attached to one end of said plunger, said cap allowing for manual operation of said remotely controlled simulated linear circuit breaker assembly;

a controller circuit card assembly having a first input and a second input, a first output connected and electrically coupled to said first lead of said solenoid, and a second output connected and electrically coupled to said second lead of said solenoid, whereby when a control voltage is applied to said first input of said controller circuit card assembly, said plunger is extracted from said solenoid housing by said spring, and when a control voltage is applied to said second input of said controller circuit card assembly, said plunger is pulled into said solenoid housing, or in the alternative, in the absence of a control voltage being applied, said remotely controlled simulated linear circuit breaker assembly may be operated manually.

28. The maintenance trainer system according to claim 27, the cap further comprises a recessed cup on the front of said cap.

29. The maintenance trainer system according to claim 27, wherein each of said remotely controlled simulated linear circuit breaker assemblies further comprises an indicator mark on said plunger and positioned behind said cap.

30. The maintenance trainer system according to claim 27, wherein said controller circuit card assembly further comprises:

a first transistor connected and electrically coupled between a supply voltage and said first lead of said solenoid and a second transistor connected and electrically coupled between said supply voltage and said second lead of said solenoid; and a third transistor connected and electrically coupled between said first input of said controller circuit card assembly and said first lead of said solenoid and a fourth transistor connected and electrically coupled between said second input of said controller circuit card assembly and said second lead of said solenoid, whereby when a control voltage is applied to said first input of said controller circuit card assembly, current flows from said second transistor through said second lead of said solenoid to said first lead of said solenoid, and when a control voltage is applied to said second input of said controller circuit card assembly, current flows from said first transistor through said first lead of said solenoid to said second lead of said solenoid, or in the alternative, in the absence of a control voltage being applied, said remotely controlled simulated linear circuit breaker assembly may be operated manually.

31. The maintenance trainer system according to claim 30, wherein said first and second amplifiers are PNP transistors and said third and fourth amplifiers are FET transistors.

32. The maintenance trainer system according to claim 27, wherein said controller circuit card assembly further comprises:

a hole in said plunger to allow a light beam to pass through when said plunger is extracted from said solenoid housing; and an optical sensor for sensing said light beam.

33. The maintenance trainer system according to claim 32, wherein said optical sensor is a photo interrupter.

34. The maintenance trainer system according to claim 27, further comprising a transient suppressor connected and electrically coupled in parallel with said solenoid leads to reduce back EMF transients.

* * * * *